United States Patent [19]
Katsura et al.

[11] Patent Number: 4,727,502
[45] Date of Patent: Feb. 23, 1988

[54] PROGRAMMABLE ELECTRONIC CALCULATOR

[75] Inventors: Hiroo Katsura; Tsutomu Takahara, both of Nara; Yusuke Suzuoki, Osaka; Junji Tanaka, Yamatokoriyama, all of Japan

[73] Assignee: Sharp Kabushiki Kaisha, Osaka, Japan

[21] Appl. No.: 894,741

[22] Filed: Aug. 11, 1986

Related U.S. Application Data

[63] Continuation of Ser. No. 513,081, Jul. 12, 1983, abandoned.

[30] Foreign Application Priority Data

Jul. 12, 1982 [JP] Japan ................... 57-121859
Jul. 13, 1982 [JP] Japan ................... 57-122406

[51] Int. Cl.$^4$ ............... G06F 15/02; G06F 15/04
[52] U.S. Cl. ............................................. 364/706
[58] Field of Search ......... 364/706, 715, 900 MS File

[56] References Cited

U.S. PATENT DOCUMENTS

| | | | |
|---|---|---|---|
| 3,979,058 | 9/1976 | Katz et al. | 364/706 |
| 4,009,379 | 2/1977 | Musch | 364/706 |
| 4,107,782 | 8/1978 | Cochran | 364/706 |
| 4,156,917 | 5/1979 | Olander, Jr. et al. | 364/706 |
| 4,291,385 | 9/1981 | Osborne et al. | 364/706 |
| 4,402,056 | 8/1983 | Sado et al. | 364/900 |
| 4,412,300 | 10/1983 | Watson et al. | 364/706 |
| 4,554,641 | 11/1985 | Haneda et al. | 364/706 |

OTHER PUBLICATIONS

Musch et al "Powerful Personal Calculator Systems Sets New Standards" *Hewlett-Packard Journal* vol. 31, No. 3, pp. 3–12, Mar. 1980.
Farish et al. "Personal Programming a Complete Owner's Manual for TI Programmable 58c/59" 1977, pp. IV-16-IV-21.

*Primary Examiner*—Gary V. Harkcom
*Assistant Examiner*—Dale M. Shaw
*Attorney, Agent, or Firm*—Birch, Stewart, Kolasch & Birch

[57] ABSTRACT

A programmable electronic calculator comprises a program command memory for storing program commands, a comment information input device actuated for inputting new comment information in place of the program commands, a detection device for detecting that the new comment information is inputted, an output buffer for storing the inputted comment information in place of or together with each of the program commands, an output device for permitting the output buffer to output its contents, and a CPU for perform calculations according to the contents of the program command memory and the output buffer.

2 Claims, 8 Drawing Figures

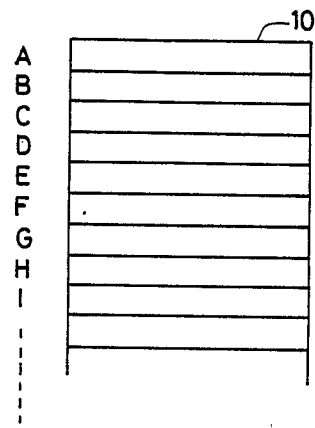

PROGRAMMABLE ELECTRONIC CALCULATOR

This application is a continuation of application Ser. No. 513,081 filed on July 12, 1983, now abandoned.

BACKGROUND OF THE INVENTION

The present invention relates to a to a programmable electronic calculator in which a program can be stored.

Conventional programmable electronic calculators have been able to output comment information which has been programmed in the main body of a computer program using, for example, the "BASIC" lauguage. However, it has been impossible to change the comment information programmed without altering the structure of the main program.

For example, when the specific comment information of "PRINT "MODEL" B" has been programmed, the numerical data of "B" and the comment "MODEL" are combined in an output format.

To change the comment information, numerical variables have been defined. However, this method requires a very complicated program.

For example, even using numerical variables, a new program must be formed to add an input sentence to change the comment information. Thus, the conventional system has required complex programs.

Further, in the conventional program formation using the "BASIC" language, the respective program steps must be accompanied by respective line serial numbers. In addition, addresses of data memory for storing numerical data for "COST", "MARGIN", calculated results of a formula, or other information must be selected. TABLE I shows an example of such a program.

| TABLE I | |
|---|---|
| 10: | INPUT "COST"; A |
| 20: | INPUT "MARGIN"; B |
| 30: | C = A ÷ (1 − B/100) |
| 40: | PRINT "LIST" PRICE"; C |

Because the conventional program processing method requires the selection of addresses of the dama memory, it has been advantageous that any address can be selected among all the addresses of the data memory.

In many business calculations instruction commands are not contained because most of these calculations do not require complicated explanation for understanding the output data. In such a case, it is satisfactory to select the any memory region of the data memory. Therefore, it has been disadvantageously troublesome that, in program formation, the line serial numbers and the addresses of the data memory to be used must be selected.

SUMMARY OF THE INVENTION

Accordingly, it is an object of the present invention to provide an improved programmable calculator for most efficiently combining comment information with numerical data.

It is another object of the present invention to provide an improved programmable calculator able to output, in place of programmed comment information, new comment information which is key inputted by the operator.

It is a further object of the present invention to provide an improved programmable calculator for operation according to a simplified program.

Briefly described, in accordance with the present invention, a programmable electronic calculator comprises a program command memory for storing program commands, a comment information input means for inputting comment information in place of the program commands, a detection means for detecting the presence and the absence of inputted comment information, an output buffer means for storing inputting comment information in place of or together with each of the program commands, an output device for permitting the output buffer means to output its contents, and a CPU means for calculating the contents of the program command memory and the output buffer means.

In a specific form of the present invention, the programmable calculator comprises a data memory for storing data in such a way that the memory addresses of the data memory correspond to information representative of the serial numbers of program lines as stored in a program memory. The information representative of the serial numbers of the program lines is used to select a specific address for writing in or reading out of the data memory either key input data or calculated results using the key input data.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 shows the format of a program command memory,

FIG. 3 shows the format of an output buffer memory;

FIG. 6 shows the format of a data memory used in accordance with the other form of the present invention;

FIG. 7 shows the format of a program memory used in accordance with the other form of the present invention.

DESCRIPTION OF THE INVENTION

Figure 1:
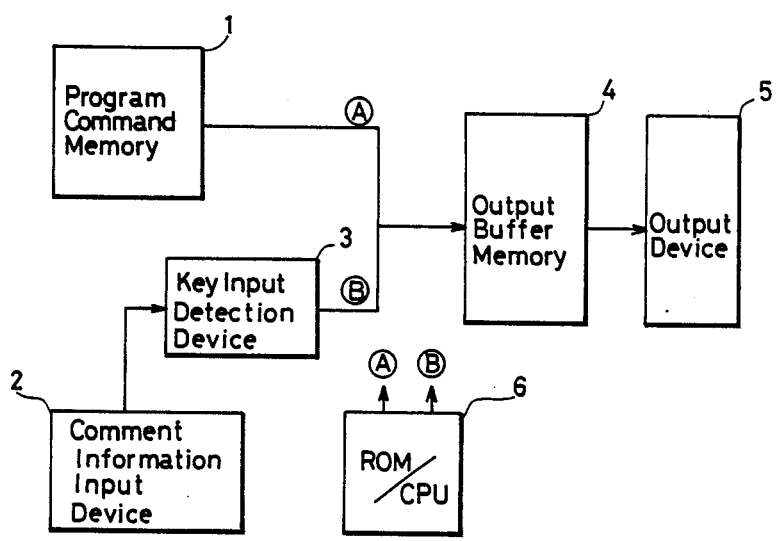
FIG. 1 shows a block diagram of a circuit of a programmable calculator according to the present invention.

FIG. 1 shows a block diagram of a circuit of a programmable calculator according to the present invention.

The circuit of FIG. 1 comprises a program command memory 1, a comment information input device 2, a key input detection device 3, an output buffer memory 4, an output device 5, and a ROM/CPU 6.

The program command memory 1 stores program commands. The comment information input device 2 is actuated to receive inputted comment information and substituted that information for the program commands stored. For example, where the comment information is programmed as "MODEL", the operator would input a specific model number in place of "MODEL". The key input detection device 3 is provided for detecting whether any comment information is inputted. The output buffer memory 4 is provided for storing inputted comment information. The output device 5 is provided for outputting the contents of the output buffer memory 4 in the form of printing, displaying, or the like.

The ROM part of ROM/CPU 6 is responsive to the program commands outputted from the program command memory 1 for directly inputting them into the output buffer memory 4 as denoted as A in FIG. 1 or replacing the program commands with key inputted comment information and later inputting the results into the output buffer memory 4 as denoted as B in FIG. 1. The CPU of the ROM/CPU 6 controls the whole sequencies.

FIG. 2 shows an example of the format structure of a program step of the commands as written in a RAM. In the preferred embodiment, these commands are written into the program command memory 1.

Step 1 of the commands of FIG. 2 stores letters "MODEL" as a comment, a separation code "A/N" (alphabet/numeral) for separating the alphabets and the numerals with parentheses for containing numeral data therein as related to the comment.

Step 2 stores letters "QUANTITY" as a comment, the "A/N" code, and parentheses for containing numeral data as related to the comment.

FIG. 3 shows an example of commands written into the output buffer memory 4.

When any comment information is key inputted, the program commands stored in the output buffer memory 4 are replaced by the comment information inputted. In this manner, the comment information can be outputted with priority.

Figure 4:
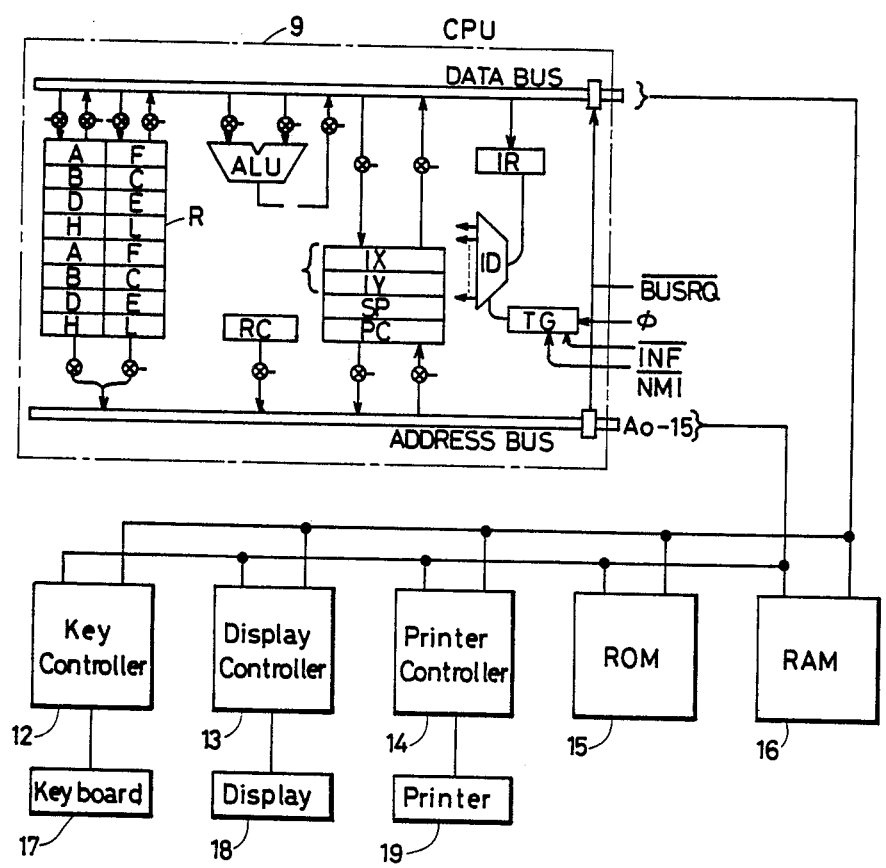
FIG. 4 shows a block diagram of the circuit of FIG. 1 in a ROM-RAM version.

FIG. 4 shows a ROM/RAM-basis system configuration of a circuit of the programmable calculator according to the present invention.

The system configuration of FIG. 4 comprises a CPU 9, a key controller 12, a display controller 13, a printer controller 14, a ROM 15, a RAM 16, a keyboard 7, a dislay 18, and a printer 19.

The CPU 9 comprises an interrupt controller TG, an instruction decoder ID, an instruction register IR, two index registers IX and IY, a stack pointer SP, a program counter PC, a refresh counter RC, an arithmetic-logic unit ALU, a group of working registers R. The decoder ID serves to decode the contents of the instruction register IR. The group of working registers serve as accumulaters for selecting addresses of the memories. A data bus and an address bus are provided for intercommunicating these portions of the CPU 9 to send the data and select the addresses.

The key controller 12, the display controller 13, the printer controller 14, the ROM 15, and the RAM 16 are all connected to the CPU 9 via an interface.

The keyboard 17 including a plurality of key switches is connected to the key controller 12. The display 18 is connected to the display controller 13. The printer 19 is connected to the printer controller 14.

The ROM 15 stores a great number of steps for writing in and reading out the various commands into or from the memories. The ROM 15 comprises locations directed to the various jobs such as the display, the print, the operation etc.

The RAM 16 serves as the program command memory 1, the output buffer memory 4, a program step counter, a flip-flop or flags set in response to the input of the comment information. The CPU 9 controls the transfer of and processing information between the memories and the controllers.

Figure 5:
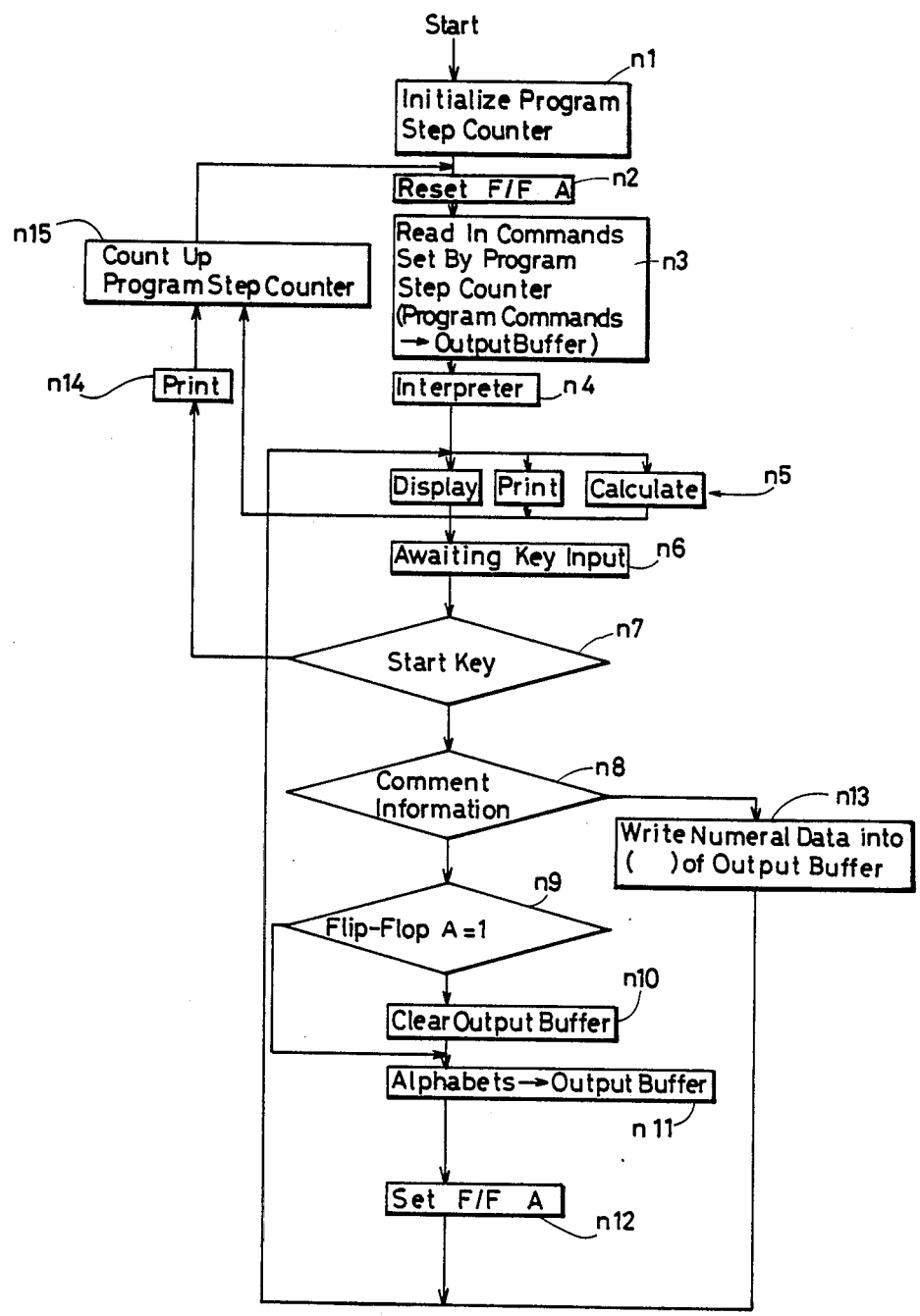
FIG. 5 shows a flow chart of the operation of the programmable calculator of the present invention.

FIG. 5 shows a flow chart of the operation of the programmable calculator of the present invention.

First, the program including comment information, for example, "MODEL" is written into the program command memory 1 of the RAM 16.

Thereafter, the processing of comment information proceeds within the system as follows:

Step n1: The contents of the program step counter as formed in the RAM 16 is initialized.

Step n2: A flip-flop A in the RAM 16 is reset, which is set in response to the input of the comment information.

Step n3: The commands directed by the program step counter are read in. The program commands in the RAM 16 are stored into the output buffer memory 4 of the RAM 16 as shown in FIG. 3.

Step n4: An interpreter then categorizes each program command according to its respective function.

Step n5: After the interpreter is completed and the command performed, in the preferred embodiment of the present invention, the program command is displayed to await the key input operation in step n6.

Step n6: To output the key-inputted comment information in place of the programm commands of the desired comment information is inputted.

Steps n7 and n8: The input the comment information allows the program to select steps n7 and n8. In step n8, it is detected whether any comment information is inputted.

Step n9: When any comment information is detected in step n8, step n9 is selected, in which it is detected whether flip-flop A=1.

Step n10: Since A≠1, the contents of the output buffer memory 4 are cleared.

Step n11: One or more characters of the newly inputted comment information are stored into the output buffer memory 4.

Step n12: The flip-flop A in the RAM 16 is set, indicating that the comment information is inputted.

Step n5: This step is reselected, in which a display of the comment information is enabled.

Step n6: The key input operation is awaited.

Steps n7 and n8: The input of the numeral data allows the program to select steps n7 and n8. In step n8, it is detected that the key operations of A/N are not related to any comment information.

Step n13: This step commands that the numeral data are written into the output buffer memory 4.

Step n5: This step is reselected in which the comment information and the numeral data are displayed.

Step n7: When the inputs of the comment information and the numeral data are completed, step n7 is selected in which a program start key in the keyboard 17 is actuated.

Step n4: An item of comment information plus any accompanying numerical data is printed.

Step n15: The program step counter of the RAM 16 is counted up to perform the second step.

If amended comment information is not inputted, any numerical data corresponding to the original comment information will be processed and printed.

Thus, the program commands corresponding to the program counter PC of the CPU 9 are stored into the output buffer memory 4 as shown in FIG. 3. The interpreter is provided for alloting the various jobs. In the display mode, any key input operation is awaited, so that the comment information or corresponding numeral data are inputted.

When the comment information is inputted, the previous command is cleared and the inputted comment is stored into the output buffer memory 4, so that the inputted comment is outputted and printed with priority.

That is, the key input operation is awaited first. When the start key is not inputted, it is detected whether the comment information is inputted. If the comment information is inputted, the condition of the flip-flop A is detected. When A=0, the output buffer memory 4 is cleared, so that the presently inputted comment information is stored into the output buffer memory 4. The display is comment information is performed, so as to await the key input operation. When the numeral data are inputted, the numeral data are entered within parenthesis. Thus, the presently inputted comment information can be outputted and printed out with priority in place of the programmed comment information by operating the output buffer memory 4.

In the preferred embodiment of the present invention, the programmed comment information is cleared from the output buffer memory 4 to store the newly inputted comment information.

It may be possible that the both items of comment information can be stored in the output buffer memory 4 without any cancellation of the programmed comment information.

This may be enabled by providing a cursor operation to the output buffer memory as described below:

TABLE II

| Key Input | Display |
|---|---|
| ► | MODEL? |
| ► ► ► ► ► | ►MODEL? |
| TV351 | MODEL TV351 |

As shown in TABLE II, by actuating a cursor, the cursor can be positioned at the position after the programmed comment so as to supplement it with additional comment information. The programmed comment information and the presently inputted comment information can be combined in an output format. By actuating the start key, the contents of the output buffer memory 4 can be printed out or displayed, so that the next program step may be selected.

In a second preferred embodiment, the circuit of the programmable calculator is also shown in FIG. 4 except the ROM 15 stores the control program to perform the flow chart of FIG. 4. The RAM 16 includes a data memory and a program memory.

FIG. 6 shows the format of the data memory 10 formed in the RAM 16.

The data memory 10 stores the inputted numeral data related to the comment information, and the results are calculated based upon the numeral data according to the program formula. The addresses of the memory for storing the numeral data and the calculated results equal the serial numbers of the program line stored in the program memory.

FIG. 7 shows the format of the program memory 11.

The program memory 11 stores programs, for example, "A COST A/N ( ) B MARGIN". In FIG. 7, "A", "B", and "C" indicate the serial numbers of the program lines formed in the form of characters. Thus, the characters "A", "B", and "C" indicate the program steps and the addresses of the data memory 10.

Items "COST", and "MARGIN" indicate the comment information. The item "A/N" indicates a separation code between the characters and the numerical data.

The program memory 11 stores the following as illustrated in TABLE III in a similar manner to that illustrated in TABLE I.

TABLE III

| A: | COST |
|---|---|
| B: | MARGIN |
| C: | LIST PRICE A ÷ (1 − B/100) |

Figure 8:
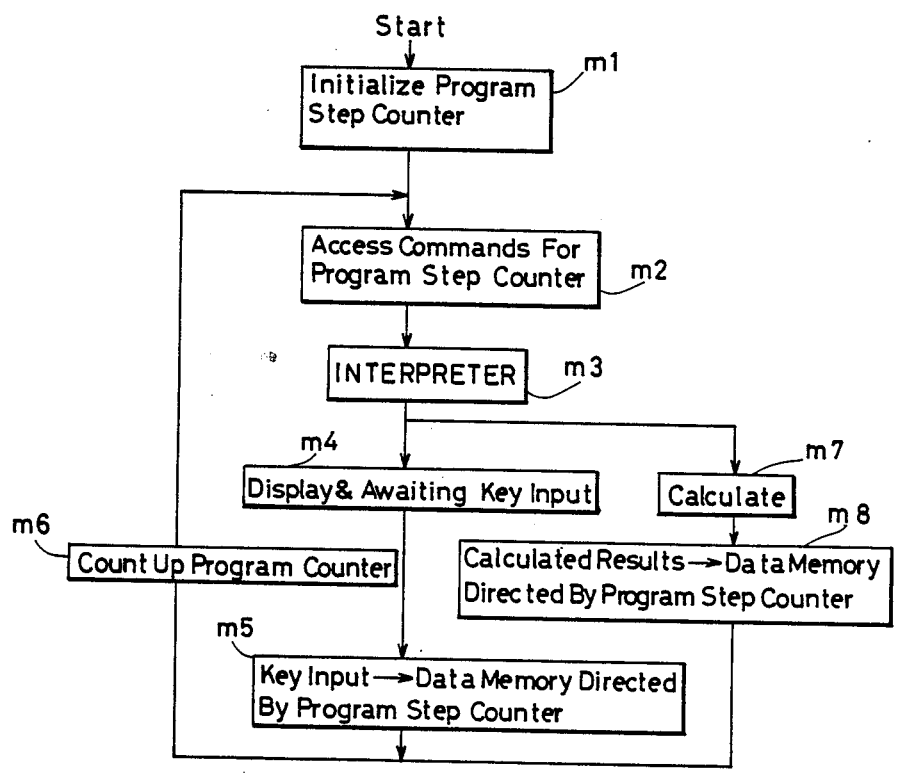
FIG. 8 shows a flow chart of the programmable calculator according to the other form of the present invention.

FIG. 8 shows a flow chart of the operation for performing the program commands of TABLE III.

First, the program is stored in the program memory 11 within the RAM 16, as shown in FIG. 7.

Step m1: The program step counter is initialized, so as to count up the progression of program commands executed.

Step m2: When the counted value equals the code "A" of the first program serial number information, the comment is read out.

Step m3: after the command is accessed, The comment is interpreted.

Step m4: Thereafter, the comment "COST" is displayed and the cursor is flickered to indicate that the key input operation of the numeral data as related to the displayed comment is awaited.

Step m5: When the numeral data is inputted, it are stored into the address of the data memory 10 as directed by the counted value of the program step counter.

Step m6: The program step counter is counted up to perfrom the next program step.

Similarly, when a next comment is displayed and the corresponding numeral data is inputted, this numerical data is stored into the address of the data memory 10 as directed by a second counted value of the program step counter. FIG. 6 shows the order of the program sequencies.

Step m7: After the values related to the respective comments are stored into their respective addresses of the data memory 10 as directed by the program line serial numbers the next comment is interpreted depending upon the value of the next counted value of the program step counter, so that a specific operation is carried out using the numerical data as stored in the addresses of the data memory 10.

Step m8: The calculated results are stored into the third address of the data memory 10 as directed by the value of of the program step counter.

Thus, as shown in TABLE III, using the program line serial number information indicating the memory address of the data memory 10, the selection of the address is carried out based on the program line serial number, the address being selected to write in or read out the key input data and the calculated results using the numerical data in the data memory 10. The key input data are inputted as related to the display of the program comments. This simplifies the program formation.

It may be possible that any direct numeral data can indicate the characters "A", "B", and "C" in the example as shown in TABLE III.

While only certain embodiments of the present invention have been described, it will be apparent to those skilled in the art that various changes and modifications may be made therein without departing from the spirit and scope the present invention as claimed.

What is claimed is:

1. A programmable calculator comprising:

program command memory means for storing a plurality of program command steps including comment information to be displayed, said comment information identifying specific data displayed therewith;

output buffer means connected to said program command memory means for storing a selected program command step from said memory means to be processed;

display means for displaying said selected program command step stored in said buffer means;

comment information input means for inputting comment information for modifying the comment information of the command step stored in said output buffer means and displayed by said display means;

detection means, responsive to the comment information input means, for detecting that the comment information is inputted;

said output buffer means being responsive to said detection means for storing said command step as modified by the comment information inputted by said comment information input means;

output means for permitting the output buffer means to output its contents; and

CPU means for processing the contents of the program command steps stored in the output buffer means.

2. The calculator of claim 1, wherein the comment information input means comprises a keyboard including a plurality of key switches.

* * * * *